United States Patent
Yang et al.

(10) Patent No.: US 7,647,393 B2
(45) Date of Patent: Jan. 12, 2010

(54) SERVER LOAD BALANCING APPARATUS AND METHOD USING MPLS SESSION

(75) Inventors: Sun Hee Yang, Daejeon (KR); Hyeon Sik Yoon, Daejeon (KR); Pyung Koo Park, Daejeon (KR); Ho Sun Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 795 days.

(21) Appl. No.: 10/826,205

(22) Filed: Apr. 15, 2004

(65) Prior Publication Data

US 2005/0080890 A1    Apr. 14, 2005

(30) Foreign Application Priority Data

Oct. 14, 2003    (KR) .................... 10-2003-0071449

(51) Int. Cl.
  *G06F 15/173* (2006.01)
(52) U.S. Cl. .................. 709/223; 709/230; 709/236; 709/238; 370/236; 707/10
(58) Field of Classification Search ............... 707/10; 709/236, 238, 223; 370/236
  See application file for complete search history.

(56) References Cited

U.S. PATENT DOCUMENTS

| | | | |
|---|---|---|---|
| 6,412,077 B1 * | 6/2002 | Roden et al. ................ 714/4 |
| 6,587,866 B1 | 7/2003 | Modi et al. |
| 6,601,084 B1 | 7/2003 | Bhaskaran et al. |
| 6,665,273 B1 * | 12/2003 | Goguen et al. ............. 370/252 |
| 6,856,991 B1 * | 2/2005 | Srivastava .................. 707/10 |
| 6,910,074 B1 * | 6/2005 | Amin et al. ................ 709/227 |
| 7,003,574 B1 * | 2/2006 | Bahl ........................... 709/228 |
| 7,046,680 B1 * | 5/2006 | McDysan et al. ........... 370/396 |
| 7,093,127 B2 * | 8/2006 | McNulty et al. ............ 713/168 |
| 7,209,977 B2 * | 4/2007 | Acharya et al. ............ 709/240 |
| 7,212,527 B2 * | 5/2007 | Shah et al .................. 370/389 |
| 7,230,913 B1 * | 6/2007 | Vasseur et al. .............. 370/216 |
| 7,257,119 B2 * | 8/2007 | Uttaro ...................... 370/395.1 |
| 7,469,337 B2 * | 12/2008 | McNulty et al. ............ 713/168 |
| 2004/0114595 A1 * | 6/2004 | Doukai ....................... 370/389 |
| 2004/0151181 A1 * | 8/2004 | Chu et al. ................... 370/392 |
| 2004/0225895 A1 * | 11/2004 | Mukherjee et al. .......... 713/201 |
| 2004/0243715 A1 * | 12/2004 | Yokoyama ................. 709/231 |
| 2005/0149531 A1 * | 7/2005 | Srivastava ................... 707/10 |

FOREIGN PATENT DOCUMENTS

JP        2002-247086        8/2002

* cited by examiner

*Primary Examiner*—Hassan Phillips
*Assistant Examiner*—Saket K Daftuar
(74) *Attorney, Agent, or Firm*—Blakely, Sokoloff, Taylor & Zafman, LLP

(57) ABSTRACT

The present invention provides a server load balancing apparatus using MPLS session labels. The server load balancing apparatus includes a packet analyzing unit, a load balancing processing unit, a session label switching unit, a session managing unit, and a session label managing unit. The packet analyzing unit inspects whether a session label has been attached to a received packet, analyzes header information of the received packet to learn session information, and attaches a session label to a header of the received packet. The load balancing processing unit assigns a server to a session of the received packet without the session label attached. The session label switching unit hardware-switches the received packet with the session label attached using only the session label information. The session managing unit manages and maintains relevant information and states of sessions. The session label managing unit manages the session label.

15 Claims, 8 Drawing Sheets

| session identifier (31) | protocol (32) | source IP address (33) | destination IP address (34) | source port number (35) | destination port number (36) | session label (37) | | server (38) |
| --- | --- | --- | --- | --- | --- | --- | --- | --- |
| | | | | | | C2S | S2C | |
| 1 | TCP | 126.254.1.100 | 176.100.10.1 | 2001 | 80 | 401 | 402 | server 1 |
| 2 | UDP | 126.254.1.100 | 176.100.10.1 | 2002 | 80 | 403 | 404 | server 2 |
| ... | ... | ... | ... | ... | ... | 2n-1 | 2n | server x |

FIG. 3

| session number | session label | | destination server | client | state |
|---|---|---|---|---|---|
| | C2S | S2C | | | |
| 1 | 1 | 2 | server 1 | 129.254.127.3 | in service |
| 2 | 3 | 4 | server 2 | 131.222.108.8 | in service |
| .... | 2n-1 | 2n | server x | .... | ..... |

FIG. 7

SERVER LOAD BALANCING APPARATUS AND METHOD USING MPLS SESSION

BACKGROUND OF THE INVENTION

1. Field of the Invention

The present invention relates generally to a load balancing apparatus and method, and more particularly to a server load balancing apparatus and method using multi-protocol label switching session labels, which, when packets are transmitted from a plurality of clients to a plurality of servers through the Internet, distributes loads among the servers by attaching the multi-protocol label switching session labels to the headers of the packets in front of the servers and determining a server for connection using session label information.

2. Description of the Prior Art

As various Internet-based multimedia services and e-commerce have been popularized, a plurality of web servers constitutes a server farm having a cluster form, and a server load balancing apparatus is generally located in front of the server farm.

The server load balancing apparatus located in front of the servers to balance service or content requests from clients analyzes the information of packets received from the clients and distributes the requests among the servers using various load balancing algorithms. In this case, the continuation of a session should be maintained.

For this purpose, a conventional load balancing apparatus analyzes session information, such as Internet Protocol (IP) address information, transmission Control Protocol (TCP)/ User Datagram Protocol (UDP) port numbers, hyper text transfer protocol (http) information and cookie information, by analyzing the information of all packets ranging from a second layer to a seventh layer. If a new session is created, the server load balancing apparatus assigns a server to the new session using a server load balancing algorithm, and stores the information in a session management table. That is, all the packets undergo a process of determining which server the packet is transmitted to through a session information analysis or a session management table search.

However, the conventional load balancing apparatus requires additional complicated software processes of comparing and analyzing the header information of all packets ranging from a second layer to a seventh layer, thus reducing the performance of the loading balancing apparatus.

Another important function of the conventional load balancing apparatus is the function of converting the IP addresses of the servers into a virtual IP address. That is, when the clients connect with the servers, the clients use information about the virtual IP address of the server load balancing apparatus rather than the actual IP addresses of the servers, so that the server load balancing apparatus performs the function of converting the IP addresses of the actual servers into the virtual IP address of the server load balancing apparatus while all packets are exchanged between the clients and the servers. As a result, this is advantageous in that the IP addresses of the actual servers are not disclosed to the public, so that the servers are protected from hacking and changes in the construction information of the actual server farm do not affect the clients.

However, the conventional load balancing apparatus is problematic in that it should perform additional processes of intercepting all the packets and changing destination or source IP addresses information from the IP addresses of the actual servers to the virtual IP address of the server load balancing apparatus.

U.S. Pat. No. 6,587,866 B1 entitled "Method for distributing packets to server nodes using network client affinity and packet distribution table" discloses a method of distributing packets among servers in a server farm. U.S. Pat. No. 6,601,084 B1 entitled "Dynamic load balancer for multiple network servers" provides a method and system for monitoring the loads of servers and distributing packets to a server having the lowest load when a load balancing system located in front of a server farm consisting of a plurality of servers distributes packets among the servers. However, the preceding patents still have the problems of the prior art, and do not reduce processing overhead caused while analyzing the header information of all the packets for the load balancing.

SUMMARY OF THE INVENTION

The present invention provides a server load balancing apparatus and method in a Multi-Protocol Label Switching (MPLS)-based network, which, when a plurality of clients are connected to a plurality of servers through the server load balancing apparatus, attaches the session labels to the headers of packets whose session analysis is completed, and allows the server load balancing apparatus to determine a server for connection using only session label information, so that the load balancing apparatus does not perform a complicated process of analyzing all the packets and a function of converting the IP addresses of actual servers into the virtual IP address of the load balancing apparatus is excluded, thus considerably simplifying the process of the load balancing apparatus and, therefore, improving the performance of the load balancing apparatus.

In order to accomplish the above object, the present invention provides a server load balancing apparatus using MPLS session labels, the server load balancing apparatus being located in front of a plurality of servers connected to a plurality of clients through the Internet, analyzing requests from the clients and distributing the requests among the servers, comprising a packet analyzing unit for inspecting whether a session label has been attached to a received packet, analyzing header information of the received packet to learn session information, and attaching a session label to a header of the received packet; a load balancing processing unit for assigning a server to a session of the received packet without the session label attached in view of load balancing according to a result of the inspection of the packet analyzing unit; a session label switching unit for hardware-switching the received packet with the session label attached using only the session label information without a packet analysis process or server assignment process according to a result of the inspection of the packet analyzing unit; a session managing unit for managing and maintaining relevant information and states of sessions requested by the clients; and a session label managing unit for assigning the session label, and withdrawing and managing session label not in use.

In addition, the present invention provides a server load balancing method using MPLS session labels, in which a plurality of clients are connected to a plurality of servers, and a server load balancing apparatus located in front of the plurality of the servers analyzes requests from the clients and distributes loads among the servers, comprising a first step of the server load balancing apparatus recognizing a new session by analyzing a header of a received packet and assigning a C2S session label when the client requests service from the server through the server load balancing apparatus; a second step of the server load balancing apparatus assigning a specific server for servicing the session in view of load balancing, attaching the assigned C2S session label to the received packet, and transmitting the received packet with the C2S session label attached to the server; a third step of the server having received the packet with the C2S session attached automatically assigning an S2C session label, that is, an opposite direction session label, with reference to a value of a session label of the received packet; a forth step of the server processing the service request from the client, attaching the assigned S2C session label to the packet according to a result of the processing, and transmitting the received packet with the S2C session label to the server load balancing apparatus; a fifth step of the server load balancing apparatus having received the packet with the S2C session label attached from the server label switching the received packet to the client using the value of the session label; a sixth step of the client having received the received packet with the S2C session label attached automatically assigning the C2S session label, that is, an opposite direction session label to the received packet, with reference to the value of the session label of the received packet; a seventh step of the client attaching the packet with the assigned C2S session label attached and transmitting the packet with the assigned C2S session label to the server load balancing apparatus when the client transmits the packet to a destination server; and an eighth step of the server load balancing apparatus having received the packet with C2S session label attached from the client label switching the packet with C2S session label attached to the destination server; wherein the server load balancing apparatus determines the server for connection using information of the session label with respect to the packet with the session label attached.

BRIEF DESCRIPTION OF THE DRAWINGS

The above and other objects, features and advantages of the present invention will be more clearly understood from the following detailed description taken in conjunction with the accompanying drawings, in which:

FIG. 3 is a view showing an example of a session table of the server load balancing apparatus, according to the present invention;

FIG. 7 is a view showing an example of the assignment of values of bi-directional session labels in the process of the load balancing, according to the present invention.

DESCRIPTION OF THE PREFERRED EMBODIMENTS

Figure 1:
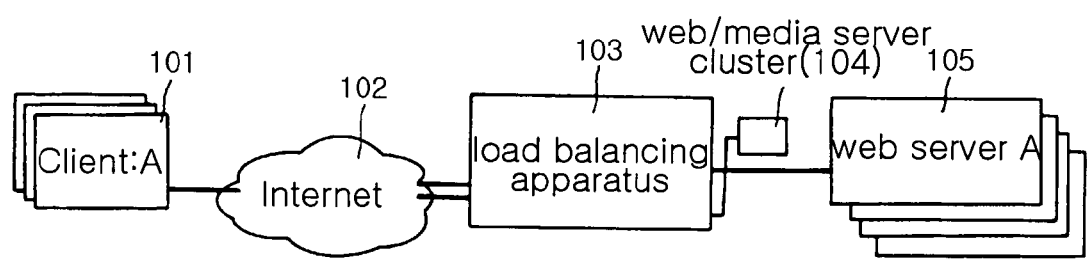
FIG. 1 is a view showing an example of the configuration of a service network to which a server load balancing apparatus according to the present invention is applied.

Reference now should be made to the drawings, in which the same reference numerals are used throughout the different drawings to designate the same or similar components.

FIG. 1 is a view showing an example of the configuration of a service network to which a server load balancing apparatus 103 according to the present invention is applied. As shown in FIG. 1, in the configuration of the service network for providing a server connection service to which the present invention is applied, a plurality of clients 101 are connected to a server farm 105 composed of a plurality of servers through the Internet 102, and the server load balancing apparatus 103 according to the present invention is located in front of the server farm 105, analyzes requests from the clients 101 and distributes the requests among the servers 105. The reference numeral 104 designates a web/media server cluster.

Figure 2:
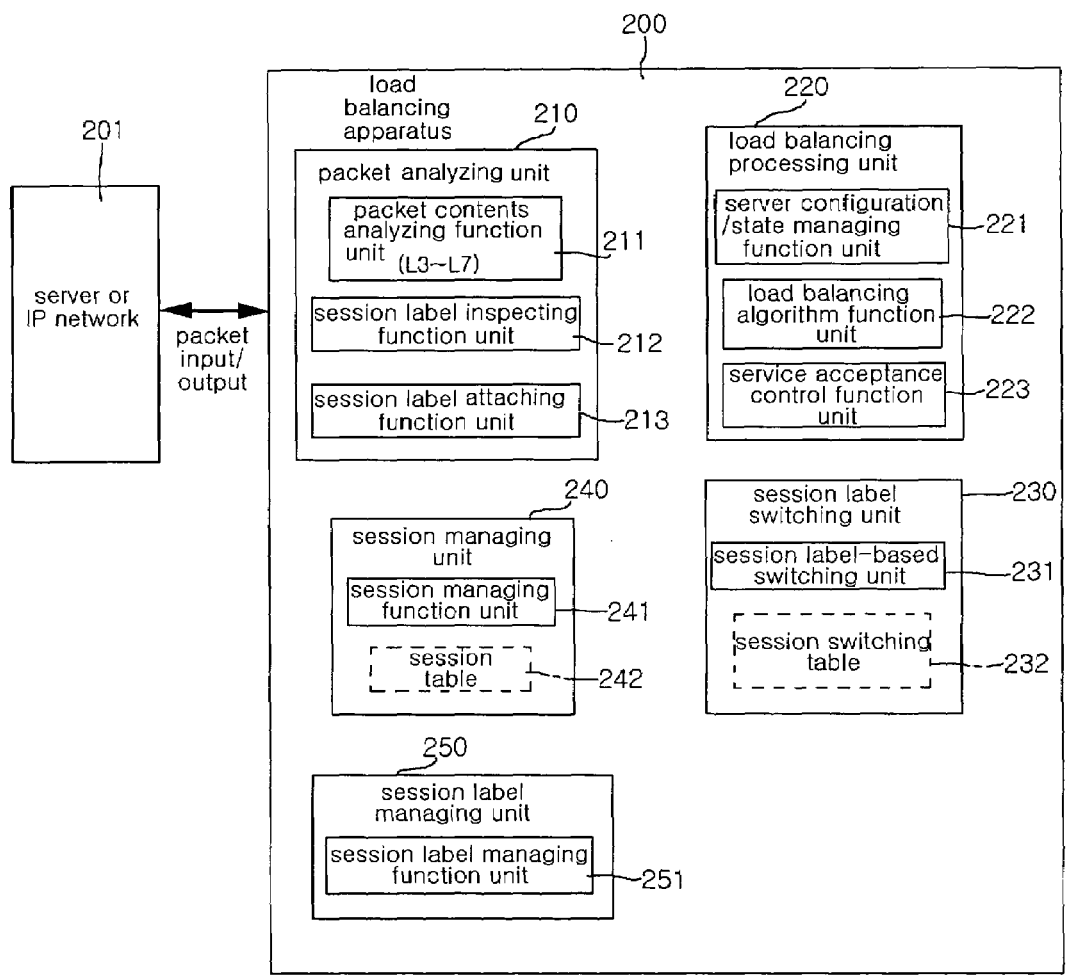
FIG. 2 is a function block diagram of the server load balancing apparatus according to an embodiment of the present invention.

FIG. 2 is a function block diagram showing a server load balancing apparatus 200 according to an embodiment of the present invention. Referring to FIG. 2, the server load balancing apparatus 200 of the embodiment includes a packet analyzing unit 210, a load balancing processing unit 220, a session label switching unit 230, a session managing unit 240 and a session label managing unit 250. Additionally, the server load balancing apparatus 200 exchanges packets having attached session labels or general IP packets with servers or an IP network 201.

The packet analyzing unit 210 includes a session label inspecting function unit 212 for inspecting whether a session label has been attached to a received packet, a packet contents analyzing function unit 211 for analyzing header information ranging from the third to seventh layers of the packet, and a session label attaching function unit 213 for attaching the assigned session label in case of need. The session label inspecting function unit 212 inspects whether the session label has been attached to the received packet, and, thereafter, transmits the received packet to the session label switching unit 230 if the session label has been attached to the received packet. If the session label has not been attached to the received packet, the packet is the packet of a new session, so that the session label inspecting function unit 212 transmits the packet of the new session to the packet contents analyzing function unit 211 to analyze the session information thereof. The packet contents analyzing function unit 211 analyzes the session information by analyzing header information ranging from the third to seventh layers of the packet, and compares the analyzed information with the contents of a session table 242 managed by the session managing unit 240. If, as a result of the comparison, a session of the received packet is new, the received packet is transmitted to the load balancing processing unit 220 to be assigned a service server. If the session of the received packet is not new, the received packet is transmitted to a relevant server with reference to the session table 242 because the client does not support the session label function. The session label attaching function unit 213 performs a function of attaching a session label to a packet that will be transmitted from a client to a server or from a server to a client.

The load balancing processing unit 220 assigns a server to the new session in view of load balancing. A load balancing algorithm function unit 222 determines a load balancing server using various algorithms, such as a Round Robin Method, the assignment of a server in view of a minimally connected server and weights, and an algorithm in view of a response time from the server. In this case, a server configuration/state managing function unit 221 performs functions of monitoring the states of servers in real time and conducting configuration management to reflect the configuration/states of the servers. Additionally, a service acceptance control function unit 223 refuses the provision of a service not to accept a service request when a reduction in service quality of the existing sessions in service may occur due to a new session. The service acceptance control function is advantageous in that the reduction of performance may be prevented because the service acceptance control function inspects only the packets of new sessions, or packets without session labels attached, and does not inspect the packets of existing sessions with the session labels attached.

The session label switching unit 230 is a module for hardware-switching packets with session labels attached at high speed without analyzing the packets or assigning a server. A session label-based switching unit 231 performs label switching with reference to the label switching table 232, which is one of core functions of the load balancing apparatus.

The session managing unit 240 is a module for maintaining and managing session information and session states requested by clients. A session managing function unit 241 functions to recognize the start, determination and interruption of a session and to add, delete and change relevant information in the session table 242. The session table 242 is referred to by the packet analyzing unit 210 or the load balancing processing unit 220 to perform functions thereof.

The session label managing unit 250 is a module for managing the session labels. A session label managing function unit 251 assigns session labels needed when sessions are added or deleted, and withdraws and controls session labels not in use. The value of the session label may be assigned to each server or the server load balancing apparatus.

FIG. 3 is a view showing an example of a session table of the server load balancing apparatus according to the present invention. Referring to FIG. 3, the session table 242 includes session identifiers 31, protocols 32 indicating the protocol characteristics of sessions, source and destination IP addresses 33 and 34, source and destination port numbers 35 and 36, bi-directional session labels values 37, and assigned server identifiers 38. In the session table shown in FIG. 3, C2S and S2C session labels indicate a client-to-server session label and a server-to-client session label, respectively.

Figure 4:
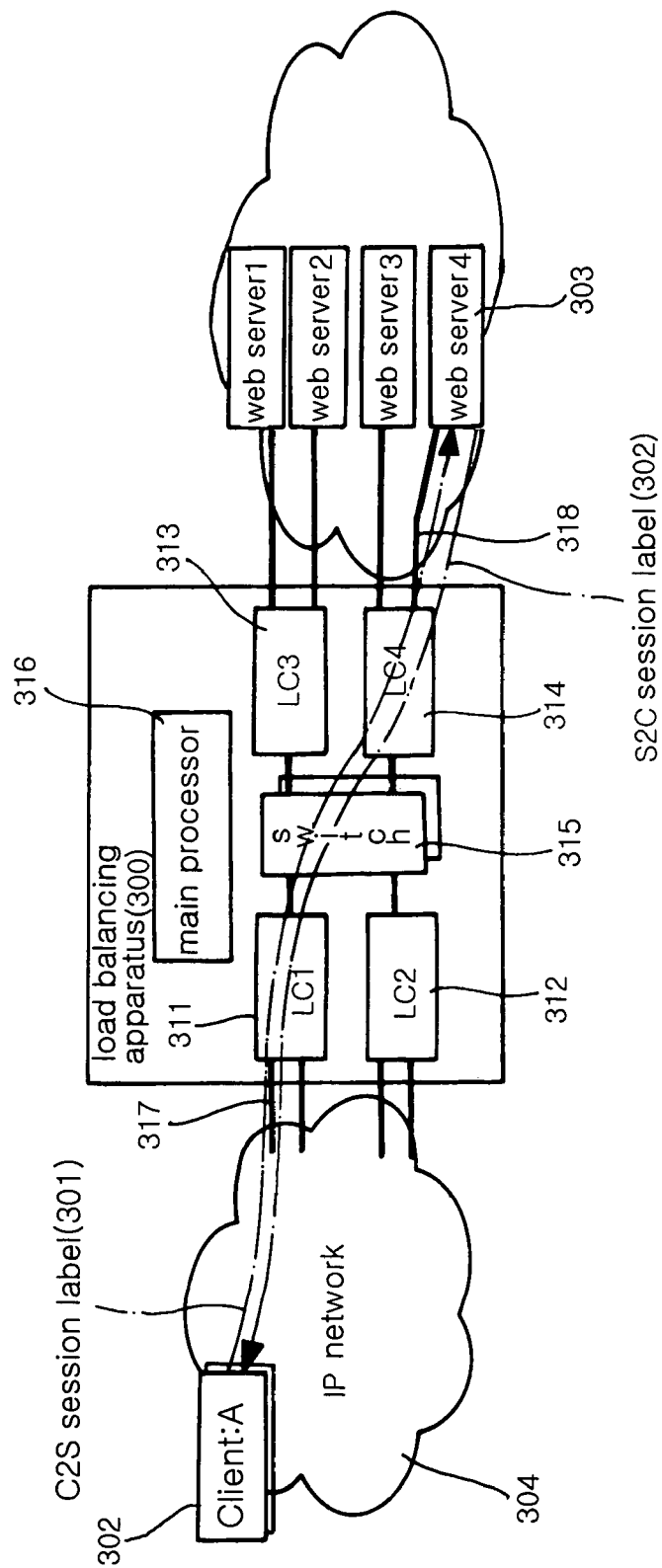
FIG. 4 is a view showing a label switching configuration of a server load balancing apparatus according to an embodiment of the present invention.
Figure 5:
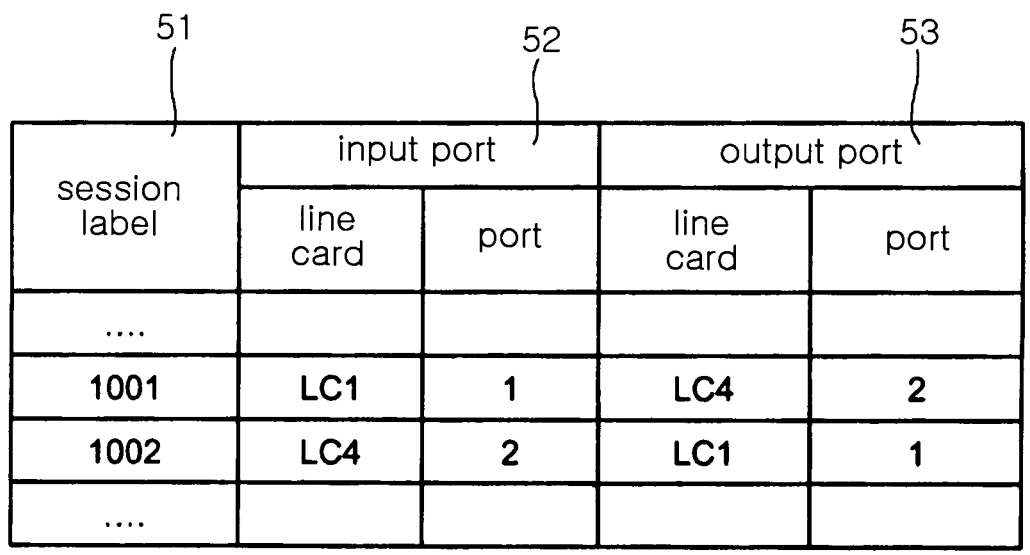
FIG. 5 is a view showing an example of a label switching table according to the present invention.

FIG. 4 is a view showing a label switching configuration of a server load balancing apparatus 300 according to an embodiment of the present invention. Referring to FIG. 4, the server load balancing apparatus 300 of the present embodiment includes a main processor 316, a plurality of line cards (LC) 311 to 314, a switch 315, and ports 317 and 318. An IP network 304 and a plurality of servers 303 are connected to the server load balancing apparatus 300 through the ports 317 and 318. It is assumed that, if a client A 302 sets up a session together with a server 4 303 and receives services while the client A 302 is connected to the server load balancing apparatus 300 through the port 1 317 of the line card 1 311 of the server load balancing apparatus 300 and the server 4 303 is connected to the server load balancing apparatus 300 through the port 2 318 of the line card 4 314, bi-directional session labels are 1001 and 1002, respectively. In this case, the label switching table 232, as shown in FIG. 5, includes the label values of connected sessions 51, and the line card and port information of input and output ports 52 and 53.

Figure 6:
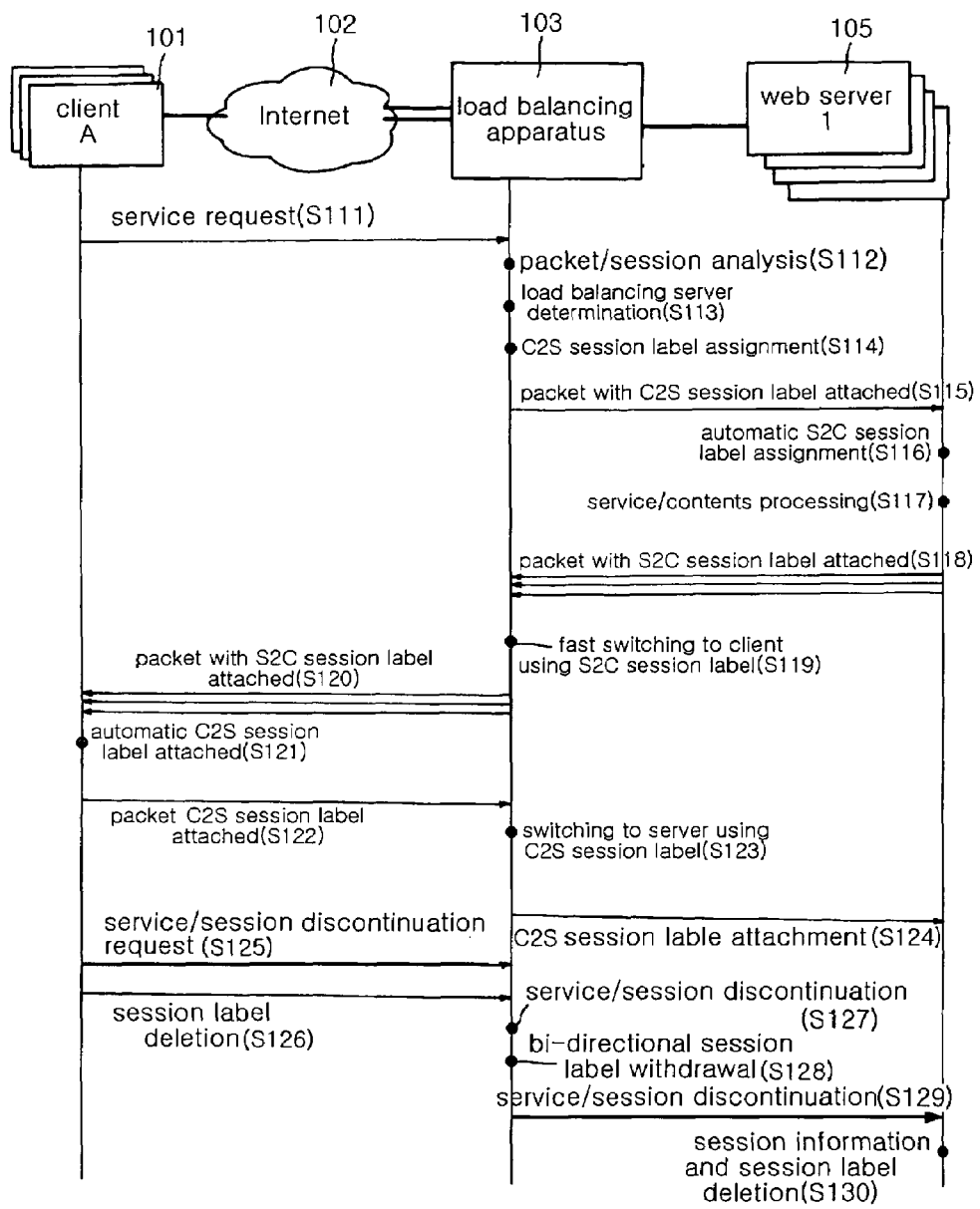
FIG. 6 is a flowchart showing a process of performing load balancing according to an embodiment of the present invention.

FIG. 6 is a flowchart showing a process of performing load balancing according to an embodiment of the present invention, which shows a process of performing load balancing in a service network for providing a server connection service to which the present invention applied. In FIG. 6, the process of performing load balancing in the service network shown in FIG. 1 is described as an example, and the components having the same constructions and functions are assigned the same reference numerals. As shown in FIG. 6, a plurality of clients 101 are connected to a server farm 105 through the Internet 102. A server load balancing apparatus 103 of the present invention is located in front of the servers 105, thus analyzing requests from the clients 101 and distributing the requests among the servers 105. A service is performed as described below.

If one of the clients 101 requests a service, such as a web connection or e-commerce, the service request is transmitted to the server load balancing apparatus 103 having a virtual IP address through a Domain Name Server (DNS) at step S111. The server load balancing apparatus 103 analyzes a received packet. That is, the server load balancing apparatus 103 learns session information by analyzing the IP address, TCP/UDP port numbers, and http information of the header of the received packet, and cookie information in case of e-commerce at step S112. When the session information of the received packet is learned, a server (for example, web server 105) for providing a service to the session is determined using server load balancing algorithms at step S113. Furthermore, a session label is assigned to be used for the session at step S114. In this case, a Client-To-Server (C2S) session label is assigned as assigned session label, and the value of the assigned session label is an odd number.

If the server for providing the service and the value of the session label are determined, the server load balancing apparatus 103 of the present invention attaches the C2S session label to the header of the received packet, and transmits the received packet to the server for providing the service at step S115. In this case, a MPLS label encapsulation construction is applied to the method of attaching the session label. The server 105 having received the packet with the C2S session label attached automatically assigns an opposite directional session label with reference to the value of the received session label at step S116. In this case, a S2C session label is assigned as the assigned session label, and the value of the assigned session label is an even number that is obtained by adding 1 to the C2S session label.

The server 105 processes the service or content request from the client 101 while maintaining the session and session label information in the system at step S117. The processed result or response message is transmitted to the client 101. At the time, the processed result or response message is transmitted to the server load balancing apparatus 103 with the S2C label attached, and the virtual IP address of the server load balancing apparatus 103 attached as a source IP address at step S118. An even number obtained by adding 1 to the value of the C2S session label received from the server load balancing apparatus 103 is used as the value of the S2C session label.

When the server load balancing apparatus 103 receives the packet with the S2C session label attached from the server 105, the server load balancing apparatus 103 performs fast hardware label switching according to the value of the session label through an interface connected to the client 101 at step S119. The packet with the S2C session attached is transmitted to the client 101. In this case, the packet is transmitted by IP routing or MPLS label switching at step S120. In the case where the packet is transmitted by the MPLS label switching, a label for tunneling should be encapsulated in the form of a first label in front of the session label. This label for tunneling functions between network apparatuses in the Internet without relation to the server load balancing apparatus 103, client 101 or server 105, and is not related to the distinctive construction of the present invention.

The client 101 having received the packet with the S2C session label attached determines the value of the C2S session label by subtracting 1 from the value of the S2C session label and automatically assigns the C2S session label in an opposite direction at step S121. When the client 101 exchanges information in the same session while maintaining session information, the client 101 attaches the C2S session label to the packet and transmits the packet with the C2S session label attached to the server load balancing apparatus 103 at step S122. When the server load balancing apparatus 103 receives the packet with the C2S session label attached from the client 101, the server load balancing apparatus 103 switches the packet to a destination server using only the value of the session label without various processes of analyzing the header of the packet at step S123. The packet with the C2S label attached is transmitted to the destination server at step S124.

When the client 101 desires to discontinue the service or session, the discontinuation of the service or session is requested from the server load balancing apparatus 103 at step S125, and the client 101 deletes the session label information at step S126. The server load balancing apparatus 103 having received the service of the session request performs the discontinuation of the session at step S127, deletes relevant information in a session management table, and withdraws the bi-directional session labels at step S128. Additionally, when the server load balancing apparatus 103 informs the destination server of the discontinuation of the session at step S129, the destination server deletes the session information and the session label information at step S130.

In the above-described process of performing the service, at steps ranging from step S114 of assigning the session label to step S129 of discontinuing the session, the packet is transmitted with the session label attached.

FIG. 7 is a view showing an example of the assignment of the values of bi-directional session labels in the process of performing load balancing according to the present invention. For example, as shown in FIG. 7, when a session 1 is created, session information is analyzed, a destination server is determined using a load balancing algorithm, and the value of a session label is assigned. In this case, 1 is assigned as the value of the C2S session label, and 2 obtained by adding 1 to the assigned value of the C2S session label is automatically assigned as the value of an S2C session label.

The method of assigning session label values is advantageous in that, if bi-directional session labels are assigned by the server load balancing apparatus, the method allows the server and the client to automatically determine the value of an opposite directional label based on the value of a received session label without an additional session label assignment protocol functioning between the client and the server. The session label assigning management session label is processed by the session label managing function of the load balancing system.

Figure 8:
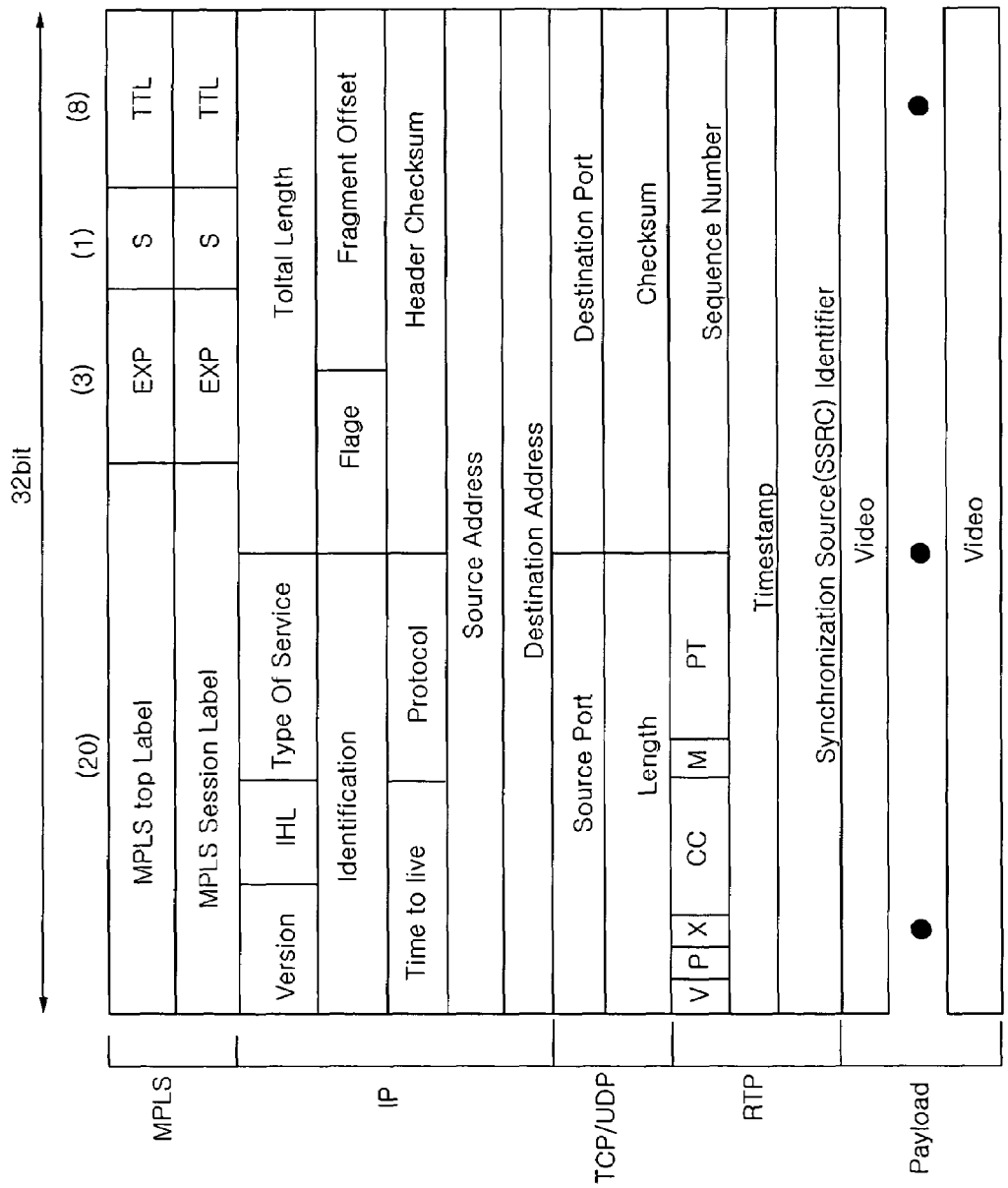
FIG. 8 is a configuration diagram of a packet in which a MPLS session label is encapsulated according to the present invention.

FIG. 8 is a view showing the configuration of a packet in which a MPLS-based session label is encapsulated according to the present invention. Referring to FIG. 8, Real-Time Transport Protocol (RTP), TCP/UDP and IP headers are attached in front of a general payload. An MPLS session label header is composed of 32-bit header including a session label (20 bits), EXP (3 bits), TTL (8 bit) and S (1 bit). The EXP and TTL of the MPLS session label header are values defined in the MPLS, but are not used in the MPLS session label. The S bit is a value indicating whether a MPLS label is stacked, and is set to 0 because it is the lowest label of the session label. A MPLS top label is used when MPLS label switching is performed on the Internet, and is attached or removed between only backbone network apparatuses.

As described above, the server load balancing apparatus and method determine a server for connection using only session label information without a complicated process of analyzing all the packets with the session label attached, so that the load balancing process may be considerably simplified.

According to the present invention, when Internet-based services, such as multimedia and e-commerce services, are provided to clients by a server farm composed of a plurality of servers, the load balancing system processes hardware label-switches packets with session labels attached to a destination server using only session label information without the complicated analysis process of analyzing header information ranging from third to seventh layers of the packets with the session labels attached. Accordingly, the process of a conventional load balancing apparatus is considerably simplified, thus improving the performance of the load balancing apparatus.

Furthermore, the server load balancing apparatus performs connection control using session label information, so that a function of converting the IP addresses of actual servers into virtual IP information with respect to all packets, which is essentially required in the conventional load balancing system, is not undergone, thus simplifying the load balancing process.

Additionally, when it is determined whether a new session is accepted, the server load balancing apparatus selectively applies the determination only to the packets without the session label attached, so that a reduction in the service quality of the packets of an existing session with the session labels attached can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A server load balancing apparatus located in front of a plurality of servers connected to a plurality of clients through the Internet, the server load balancing apparatus comprising:
   a processor coupled to a packet analyzing unit, the packet analyzing unit operates to determine whether a session label has been attached to a received packet, analyzing header information of the received packet to learn session information for the received packet without a session label, and attaching a Client-To-Server (C2S) session label to a header of the received packet;
   a load balancing processing unit that operates to assign one of the servers to a session of the received packet without a session label attached in view of load balancing;
   a session label switching unit that operates to hardware-switching the received packet with the C2S session label attached using only the C2S session label information without performing a packet analysis process or server assignment process;
   a session managing unit for managing and maintaining relevant information and states of sessions requested by the clients; and
   a session label managing unit for assigning the C2S session label, and withdrawing and managing session labels not in use,
   wherein the load balancing apparatus uses Multi-Protocol Label Switching (MPLS) session labels and analyzes requests from the clients and distributes the requests among the servers, and
   wherein the one of the servers increments a value of the C2S session label in the received packet by a predetermined number to generate a Server-To-Client (S2C) session label and transmits a response packet including the S2C session label to a requesting client, and wherein the requesting client decrements a value of the S2C session label by the predetermined number to generate the C2S session label and transmits a packet including the C2S session label to the one of the servers.

2. The server load balancing apparatus according to claim 1, wherein the packet analyzing unit comprises:
   a session label inspecting unit for inspecting whether the session label has been attached to the received packet, transmitting the received packet to the session label switching unit to switch the received packet if the session label has been attached to the received packet, and transmitting the received packet to a packet contents analyzing unit if the session label is not attached to the received packet;

the packet contents analyzing unit for learning the session information by analyzing the header information of the received packet ranging from third to seventh layers of the received packet, inspecting whether a session of the received packet is a new session, transmitting the received packet of the new session to the load balancing processing unit to assign the server to the new session if the session is new, and transmitting the packet of an existing session to a predetermined server if the session is not new; and a session label attaching unit for attaching the assigned session label to the header of the received packet.

3. The server load balancing apparatus according to claim 1, wherein the session label is an MPLS-based session label.

4. The server load balancing apparatus according to claim 1, wherein the load balancing processing unit comprises:

a load balancing algorithm unit for determining a load balancing server using a specific algorithm in view of information including a round robin method, a minimally connected server, weights and response time from the server;

a server configuration/state managing unit for managing configurations and states of the servers by performing real time server state monitoring or configuration management; and a service acceptance control unit for refusing a service request of the new session if the existing session is serviced.

5. The server load balancing apparatus according to claim 1, wherein the session label switching unit performs label switching with reference to a value of the session label attached to the header of the received packet, and a label switching table including information of line cards and ports through which the received packet is input/output.

6. The server load balancing apparatus according to claim 1, wherein the session managing unit recognizes start, determination and interruption of the session, and adds, deletes and changes relevant information in the session table.

7. The server load balancing apparatus according to claim 1, wherein the assignment of the session label is performed in such a way that the C2S session label is assigned an odd number and the S2C session label is assigned an even number obtained by adding 1 to the value of the C2S session label.

8. A server load balancing method using MPLS session labels, in which a plurality of clients are connected to a plurality of servers, and a server load balancing apparatus located in front of the plurality of the servers analyzes requests from the clients and distributes loads among the servers, comprising:

analyzing, at server load balancing apparatus, a header of a received packet and assigning a C2S session label when a requesting client requests service from the servers through the server load balancing apparatus and determining if a session has begun;

assigning, at server load balancing apparatus a specific server for servicing the session in view of load balancing, attaching the assigned C2S session label to the received packet, transmitting the received packet with the C2S session label attached to the server;

automatically assigning, at the server, an S2C session label, that is, an opposite direction session label, by incrementing a value of the C2S session label of the received packet by a predetermined number;

processing, at the server, the service request from the requesting client, attaching the assigned S2C session label to an response packet according to a result of the processing, and transmitting the response packet with the S2C session label to the server load balancing apparatus;

label switching, at server load balancing apparatus, the response packet to the client using the S2C session label;

automatically assigning, at the requesting client, the C2S session label, that is, another opposite direction session label to the response packet, by decrementing a value of the S2C session label of the response packet by the predetermined number;

attaching, at the requesting client, a packet with the assigned C2S session label and transmitting the packet with the assigned C2S session label to the server load balancing apparatus when the requesting client transmits the packet to a destination server; and label switching, at the server load balancing apparatus, the packet with the C2S session label attached to the destination server;

wherein the server load balancing apparatus determines the one of the servers for connection using information of the session label with respect to the packet with the session label attached.

9. The server load balancing method according to claim 8, wherein it is inspected whether the MPLS session label has been attached to the packet input into the server load balancing apparatus, and the packet with the MPLS session label attached is fast-switched using only information of the session label.

10. The server load balancing method according to claim 8, wherein it is inspected whether the MPLS session label has been attached to the packet input into the server load balancing apparatus, and only the header of the packet header without the session label attached is selectively analyzed.

11. The server load balancing method according to claim 8, wherein the assigning the specific server comprises:

determining whether to accept or refuse the session of only the packet without the session label attached.

12. The server load balancing method according to claim 8, wherein the server load balancing apparatus omits a function of performing mapping between a virtual IP address and an IP addresses of the server in such a way that the server attaches the virtual IP address to the header of the packet with the session label attached.

13. The server load balancing method according to claim 8, wherein the C2S session label is assigned an odd number, and the S2C session label is automatically assigned the value obtained by adding 1 to the value of the C2S session label.

14. The server load balancing method according to claim 8 or 13, wherein the assignment of the bi-directional session labels (S2S and S2C) is performed by automatically recognizing the value of the opposite directional label without using an additional protocol for assigning the session label to the packet in such a way the server and the client add 1 to and subtract 1 from the value of the session label that is attached to the packet received from an opposite party, respectively.

15. The server load balancing method according to claim 8, wherein the session label is attached to the header of the received packet according to a MPLS header configuration.

\* \* \* \* \*